Aug. 12, 1924.
C. L. COVINGTON
GRAVITY BALL TESTING APPARATUS
Filed March 30, 1922
1,504,871
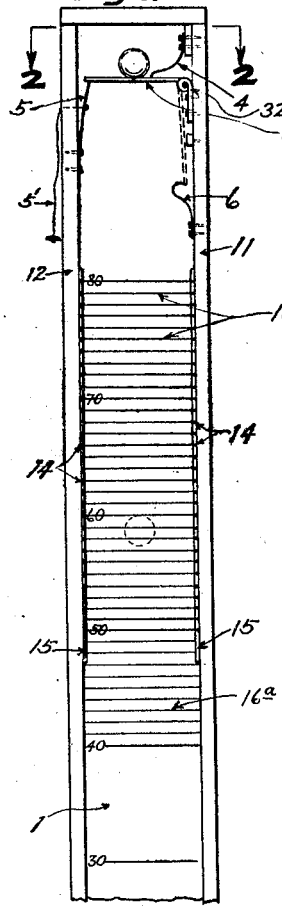
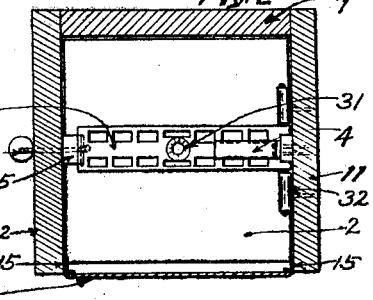
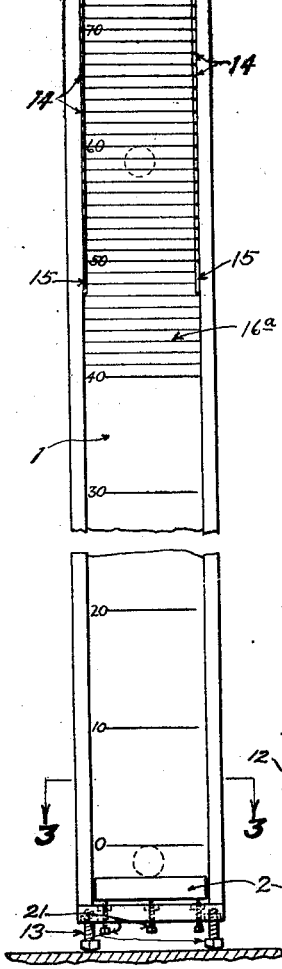
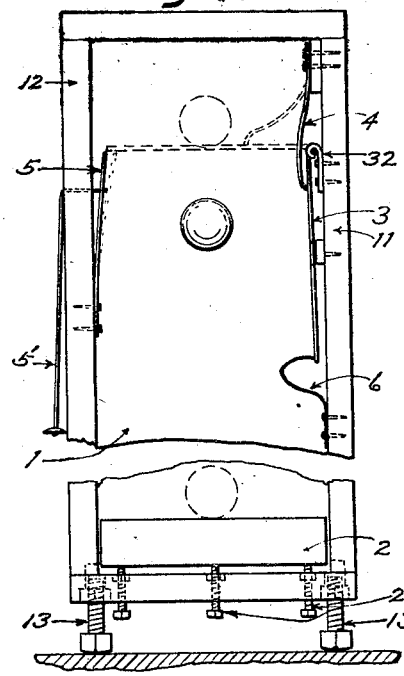
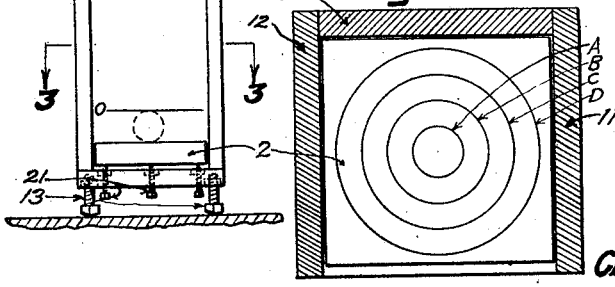
INVENTOR
CLARENCE L. COVINGTON
BY
Mitchell, Chadwick & Kent.
ATTORNEYS.

Patented Aug. 12, 1924.

1,504,871

UNITED STATES PATENT OFFICE.

CLARENCE LESLIE COVINGTON, OF BROOKLINE, MASSACHUSETTS.

GRAVITY BALL-TESTING APPARATUS.

Application filed March 30, 1922. Serial No. 547,958.

*To all whom it may concern:*

Be it known that I, CLARENCE LESLIE COVINGTON, a citizen of the United States, residing at Brookline, in the county of Norfolk and State of Massachusetts, have invented certain new and useful Improvements in Gravity Ball-Testing Apparatus, of which the following is a specification.

My invention is an instrument for testing the resiliency of various articles, particularly those spherical in shape. It is especially adapted and designed to this use in connection with balls, used in various sports, such as golf balls, base balls, and many other such articles. I shall in this specification describe my new instrument in connection with the testing of a golf ball.

Golf balls, as is well known, vary in their structure and material, in accordance with the ideas of their makers and there is some variation even in balls made by one maker and supposed to be identical. The end aimed at by all makers is, within the prescribed limits of size and weight, to attain the greatest resiliency possible. Other things being equal, the most resilient ball will have the longest flight under a blow of a given power or force.

In the drawings, Figure 1 is a front elevation of my apparatus; Figure 2 is a cross-section on line 2—2 of Fig. 1 on an enlarged scale; Figure 3 is a cross-section on line 3—3 of Fig. 1 on an enlarged scale; Figure 4 is a front elevation on an enlarged scale of the upper and lower ends of Fig. 1, the leaf in lowered position.

The standard 1, is of a height to permit the necessary acceleration of a ball, in dropping, under the influence of gravity from the upper to the lower end thereof. The drop must be, in the case of a golf ball, sufficient to develop kinetic energy capable, on impact of the ball upon the anvil, 2, of disturbing the molecular relations of the ball, to the center thereof. If less than this is accomplished, the full resiliency of the ball is not developed and an accurate measurement thereof is impossible.

At the upper end of the standard 1, a hinged leaf or support, 3, is secured to one of the side members, 11. This leaf 3, is under the control of a spring, 4, one end of which is fast to side 11 and the other end of which is in contact with leaf 3. Fast to the opposite side, 12, of the standard, is a detent, 5, normally projecting into the path of the free end of leaf 3, in a position to sustain this free end of leaf 3, against the urge of spring 4, when the leaf is raised to horizontal position. Means to control the detent, 5, is provided, in this case a cord 5', connected with detent 5 and passing through side 12.

Leaf 3 is provided on its upper surface with a shallow centering depression 31 in which the ball to be tested may securely rest in the longitudinal axis of the standard.

Fast to side 11, is preferably secured a second detent, 6.

The standard 1 is preferably provided with screw supports, 13, by means of which it may be easily adjusted in a position perpendicular to the horizontal plane. Anvil 2 is also provided with adjusting screws, 21, by means of which it may be adjusted in a horizontal plane.

In my new instrument I employ the force of gravity, which in any given test is absolutely uniform. The instrument controls the movement of the ball with absolute accuracy. The ball, after the gravitational drop, results with a bound always in exact proportion to the kinetic force developed and may be accurately measured as to its movement against gravity substantially without any factors of atmospheric interference or disturbance.

Assuming that the kinetic force developed by the designed and measured drop is sufficient to invoke the full resiliency of the ball, the ball will result in a definite upward movement in accordance with the kinetic energy developed by the ball on impact.

I have found that seventy-five inches is a suitable fall to develop the necessary molecular disturbance in a golf ball, for example. From the upper end, or suspension point the back and sides of the measuring instrument may be graduated into divisions, for example, 100 parts, by equi-distant lines 16$^a$, i. e. in the particular instance the lines would be spaced ¾ of an inch apart. As a matter of experience it will be found that the most resilient balls will rebound to about 70 degrees or marks, from the bottom or anvil. The least resilient will rebound to about 50 degrees or marks. In practice therefore it will be sufficient to graduate the instrument from 40 to 80 degrees. From 50 to 80 degrees I provide a series of holes, 14, in the metal strips 15, attached to front edges of sides 11 and 12, a hole at each side at the level of each degree-mark through which holes a cord, 16 may be laced and stretched across the open front of the instrument, coinciding with the degree marks. The object of this is to give an accurate determination of the ball's rebound by accurately leveling the eye and noting the top of the ball at the top of its rise.

In practice, the diameter of golf balls being standardized, I base the degree-marking from a point above the rest, 3, equal to the diameter of the ball, which is taken as say, 100, in order that the top of the ball may be used as the measuring factor on the rebound; greater accuracy of measurement being possible in this way than is otherwise to be obtained. And this is important since a variation of 1 per cent of resiliency will make a difference, in a 225 yard drive, of about ten feet, in flight of the ball.

The operation is as follows: The standard 1 and anvil 2, being accurately adjusted, the leaf or rest, 3, is raised to horizontal position, against the force of spring 4, where the leaf is retained by detent 5. A ball is placed, centering in depression 31. The detent 5, being retracted the spring 4, which is stiff and powerful, instantaneously throws rest 3 downward, pivoting on its hinge, 32, and the free end of leaf 3 is engaged by detent 6 and prevented from rebounding into the path of the ball. The ball falls along the vertical axis of the standard 1 upon the center of the upper face of horizontal anvil 2 and results in the path of its descent according to its accuracy of form and uniformity of its interior structure, imperfections, if any, throwing the ball more or less, somewhat out of vertical upward travel.

In order that the imperfection or lack of balance of a ball may be ascertained I mark upon the face of the anvil 2 a series of concentric rings, A, B, C, D. A is preferably 1 diameter of the ball in size, B, 2 diameters, C, 3 diameters and D, 4 diameters. An imperfectly balanced or imperfectly spherical ball will not rebound in a perfectly vertical line and on striking the anvil on the second drop, from the rebound, will strike more or less off center. The variation will not be uniform however, varying with the point of the ball which strikes the anvil, which cannot be controlled. A series of tests will produce different results, which will each be the accurate measurement of the factors of each test. The most aberrant result therefore of a series of tests, will be taken as the measure of defectiveness since each test is accurate in itself.

My device is simple and it is accurate, since it employs gravity as an actuating force for the ball, the effect of which is accurately known and set forth in many books of authority. The resiliency determination sought and obtained is absolute. The resiliency is indicated by the proportion or percentage of rebound to fall or force which proportion does not vary under any circumstances and the accuracy or inaccuracy of rebound will indicate structural imperfections and lack of balance in any ball tested and substantially the degree of imperfection by a series of tests.

The standard 1 may be formed of wood or metal. The anvil 2 is preferably of metal or stone, its upper face as smooth and flat as may be.

The fact that imperfection of shape and imperfection of density and consequent lack of perfect balance may be substantially measured is a valuable feature of my invention.

I claim:

1. In a gravity ball-testing apparatus, a vertical, graduated standard; an anvil having a horizontal face, at the lower end of the standard; a supporting leaf at the upper end of the standard above the anvil to sustain the object; a spring to actuate the leaf downward; means to sustain the leaf in horizontal position against the urge of the spring.

2. In a gravity ball-testing apparatus, a vertical standard; a horizontal anvil face at the lower end of the standard; means at the upper end of this standard, above the anvil, to suspend and release the object; self-contained means to adjust the standard to vertical position and self-contained means to adjust the anvil to horizontal position.

3. In a gravity ball-testing apparatus, a vertical standard; a horizontal anvil face at the lower end of the standard, the anvil face being graduated by a series of concentric rings to gauge inaccuracy of the secondary fall; means at the upper end of the standard, above the anvil, to suspend and release the object.

Signed at Boston, Mass., this 24th day of March, 1922.

CLARENCE LESLIE COVINGTON.